(12) United States Patent
Cheng et al.

(10) Patent No.: US 11,932,087 B2
(45) Date of Patent: Mar. 19, 2024

(54) VANITY MIRROR AND SUN VISOR WITH LIGHTING FUNCTION

(71) Applicant: Zealio Electronics Co., Ltd., HsinChu (TW)

(72) Inventors: Chia-Pao Cheng, Hsinchu (TW); Pao-Lin Guo, Hsinchu (TW); An-Tsun Teng, Hsinchu (TW)

(73) Assignee: ZEALIO ELECTRONICS CO., LTD., Hsinchu (TW)

( * ) Notice: Subject to any disclaimer, the term of this patent is extended or adjusted under 35 U.S.C. 154(b) by 64 days.

(21) Appl. No.: 17/389,578

(22) Filed: Jul. 30, 2021

(65) Prior Publication Data

US 2022/0097496 A1 Mar. 31, 2022

(30) Foreign Application Priority Data

Sep. 29, 2020 (TW) .................................. 109133899

(51) Int. Cl.
*B60J 3/02* (2006.01)
*B60Q 3/252* (2017.01)
*B60Q 3/80* (2017.01)

(52) U.S. Cl.
CPC ............ *B60J 3/0282* (2013.01); *B60Q 3/252* (2017.02); *B60Q 3/80* (2017.02)

(58) Field of Classification Search
CPC ........... B60J 3/0282; B60Q 3/80; B60Q 3/252
See application file for complete search history.

(56) References Cited

FOREIGN PATENT DOCUMENTS

| CN | 104924990 B | 12/2014 | | |
|---|---|---|---|---|
| CN | 106274397 A | 8/2016 | | |
| CN | 109795295 A | 3/2019 | | |
| CN | 110481287 A | 8/2019 | | |
| CN | 110481287 A | * 11/2019 | | |
| WO | WO-03024269 A1 | * 3/2003 | ............. | A45D 42/10 |
| WO | WO-2017008946 A1 | * 1/2017 | ............. | B60K 35/00 |

* cited by examiner

*Primary Examiner* — Anabel Ton
(74) *Attorney, Agent, or Firm* — Tung & Associates

(57) ABSTRACT

A vanity mirror with lighting function includes: a mounting portion, connected to a vehicle sun visor; a movable portion which can move relatively to the mounting portion; a mirror located in the mounting portion or the movable portion; a power storage unit; a front-open sensing unit for determining whether the vanity mirror is in a front-open state or a folded state; a sensing circuit, wherein when the vanity mirror is in the front-open state, the power storage unit conducts electrical power to the sensing circuit; and a light source for providing lighting function, wherein in the front-open state, whether to emit light and intensity of the light is determined according to the sensing result of the sensing circuit.

8 Claims, 7 Drawing Sheets

VANITY MIRROR AND SUN VISOR WITH LIGHTING FUNCTION

CROSS REFERENCE

The present invention claims priority to TW 109133899 filed on Sep. 29, 2020.

BACKGROUND OF THE INVENTION

Field of Invention

The present invention relates to a vanity mirror with lighting function, in particular to a vanity mirror that determines whether or not to turn on the lighting function according to a front-open state of the vanity mirror.

Description of Related Art

In a vehicle, the vanity mirror between the windshield glass and the driver, is already a fundamental facility. The plate mounted with the vanity mirror shield sunlight for the driver, and the vanity mirror allows the driver to check himself/herself. However, due to shielding the sunlight, the image on the mirror can be gloomy. Therefore, auxiliary light is usually provided, near the mirror, to assist making the image in the mirror clearer. The power source of such auxiliary lighting function usually comes from the vehicle battery. When the vehicle is parked for a long time and the driver forgets to turn off the auxiliary light, the auxiliary light can consume most of the electric energy stored in the vehicle battery, causing the vehicle unable to ignite. Or, when the vehicle is parked under the sunlight for a long time, the heat can accumulate therein, and the electricity used by the auxiliary light can further raise the temperature in the vehicle, which may lead to an accident.

In view of the above, the present invention provides a vanity mirror, which has both lighting and power-saving functions. Meanwhile, the quality and reliability of the vanity mirror can be significantly improved.

SUMMARY OF THE INVENTION

In one perspective, the present invention provides a vanity mirror with lighting function, comprising: a mounting portion, connected to a vehicle sun visor; a movable portion, configured to afford an angle or a distance deviation between the mounting portion and the movable portion; a mirror located in the mounting portion or the movable portion; a power storage unit; a front-open sensing unit, configured to sense the angle or the distance deviation between the mounting portion and the movable portion, to determine whether the vanity mirror is in a front-open state or a folded state according to the sensing result; a sensing circuit, wherein when the vanity mirror is in the front-open state, the power storage unit conducts electrical power to the sensing circuit; and a light source, configured to provide lighting function, wherein in the front-open state, whether to emit light and/or intensity of the light is determined according to the sensing result of the sensing circuit.

In one embodiment, the power storage unit can include batteries, an electrical energy storage unit, or a power supply unit that has both energy storage function and power generation function (such as solar cells).

In one embodiment, the front-open sensing unit can include sensing elements that sense the angle or distance deviation between the mirror and the mounting portion, such as a Hall sensor or a proximity sensor.

When the vanity mirror is in the front-open state, the power storage unit conducts electrical power to the sensing circuit. When the vanity mirror is in the folded state, the power storage unit turns off the electrical power supplied to the light source.

In another perspective, the present invention also provides a vehicle sun visor with lighting function. The vehicle sun visor is fixed to a vehicle ceiling by a ceiling attaching portion, to shield ambient light passing through a window glass. The vehicle sun visor comprises: a visor body, including a receiving portion; and a mirror assembly, including a fastening unit and a vanity mirror, wherein the fastening unit is configured to be fastened to the receiving portion and magnetically attract the vanity mirror, and wherein the vanity mirror includes: a mounting portion, magnetically attracted to the fastening unit; a movable portion, configured to afford an angle or a distance deviation between the mounting portion and the mirror; a mirror located in the mounting portion or the movable portion; a power storage unit; a front-open sensing unit, configured to sense the angle or the distance deviation between the mounting portion and the movable portion, to determine whether the vanity mirror is in a front-open state or a folded state according to the sensing result; a sensing circuit, wherein when the vanity mirror is in the front-open state, the power storage unit conducts electrical power to the sensing circuit; and a light source, configured to provide lighting function, wherein in the front-open state, whether to emit light and/or intensity of the light is determined according to the sensing result of the sensing circuit.

In one embodiment, the vehicle sun visor with lighting function further includes a pop-up rotating structure between the vanity mirror and the visor body, whereby the vanity mirror generates a pop-up movement and a rotation movement relative to the visor body.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the components or units, but not drawn according to actual scale of sizes.

Figure 1:
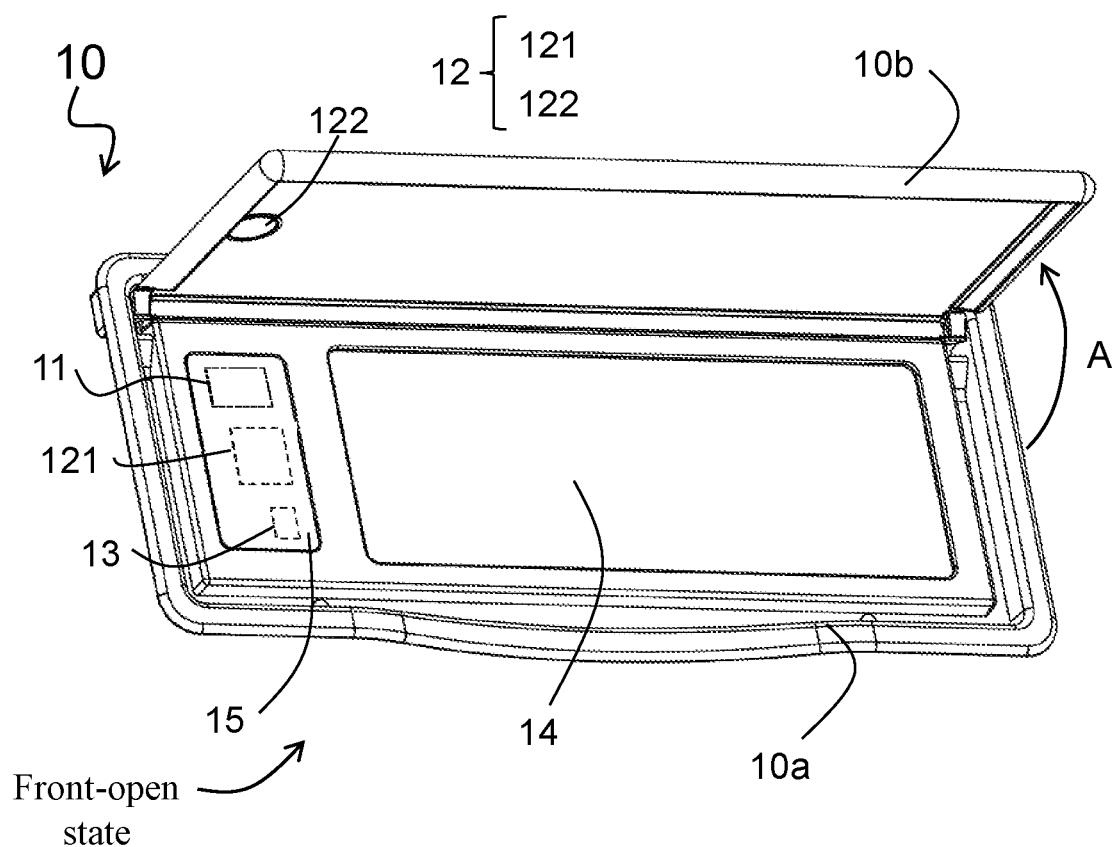
FIGS. 1 and 2 show schematic diagrams of a front-open state and a folded state of the vanity mirror according to one embodiment of the present invention.

In one perspective, the present invention provides a vanity mirror 10 with lighting function; in addition to shielding the ambient light passing through the window glass, the vanity mirror 10 according to the present invention can solve the aforementioned prior art problems, and furthermore the vanity mirror 10 according to the present invention has power-saving function. The vanity mirror 10 includes: a mounting portion 10a, a power storage unit 11, a front-open sensing unit 12, a sensing circuit 13, a mirror 14, and a light source 15. In one embodiment, the vanity mirror 10 has a front-open state (FIG. 1, the mounting portion 10a and the movable portion 10b have a rotation angle or a distance deviation in between) and a folded state (FIG. 2, the mounting portion 10a and the movable portion 10b abut against each other face to face). More specifically, the mounting portion 10a is connected to the vehicle sun visor. The power storage unit 11 is disposed in the mounting portion 10a of the vanity mirror 10. The front-open sensing unit 12 is configured to determine whether the movable portion 10b is in the front-open state or not (i.e., whether the vanity mirror 10 is in the front-open state or not), wherein FIG. 1 shows the front-open sensing unit 12 according to one embodiment of the present invention, which includes a Hall sensor 121 and a magnet 122, respectively disposed in two different parts (the mounting portion 10a and the movable portion 10b) of the vanity mirror 10, to sense an angle A between the mounting portion 10a (or the mirror 14) and the movable portion 10b to determine whether the movable portion 10b is in the front-open state or not. In another embodiment, it may be arranged in a way that the movable portion 10b is pulled out from the mounting portion 10a instead of relative rotation between the movable portion 10b and the mounting portion 10a, and the front-open sensing unit 12 can sense the distance deviation between the movable portion 10b and the mounting portion 10a to determine whether the vanity mirror 10 is in the front-open state or not. The sensing circuit 13 is configured to sense ambient light, wherein when the vanity mirror 10 is in the front-open state, the power storage unit 11 conducts electrical power to the sensing circuit 13, whereby the sensing circuit 13 is activated to sense an ambient light state of the vanity mirror 10. The mirror 14 is disposed on the mounting portion 10a. The light source 15 is disposed near the mirror 14 and is configured to illuminate the mirror 14. When in the front-open state, the light source 15 determines whether to emit light and/or the intensity of the emitted light according to the sensing result of the sensing circuit 13.

Figure 2:
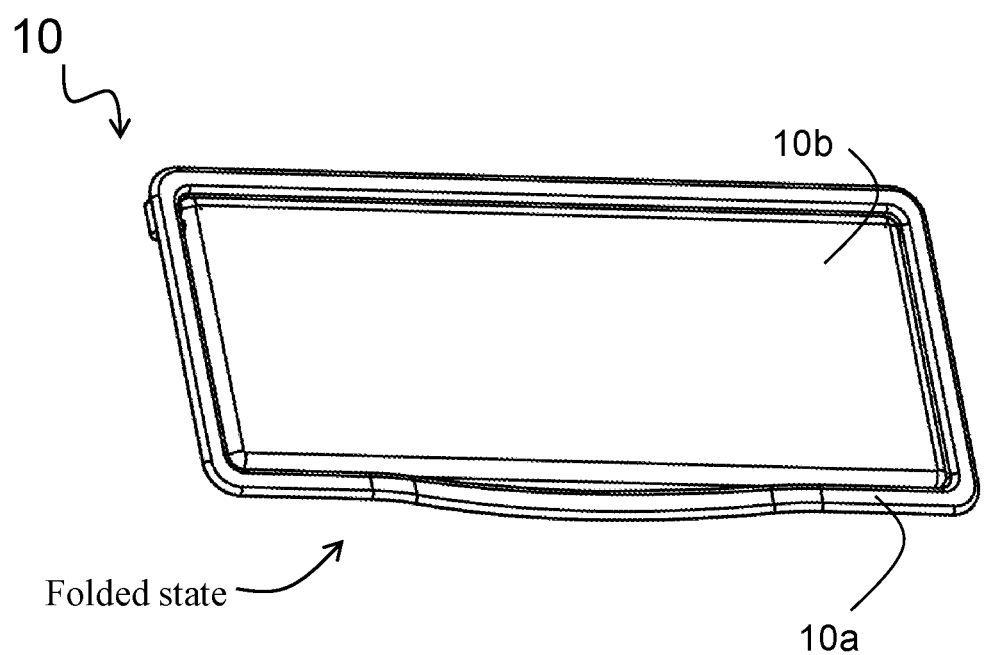

Note that the locations of the components of the vanity mirror 10 shown in FIGS. 1 and 2 can be arranged otherwise in different embodiments; in the embodiment shown in FIGS. 1 and 2, the power storage unit 11, the sensing circuit 13, and the mirror 14 are located which the mounting portion 10a, while in another embodiment, for example, one or more of the power storage unit 11, the sensing circuit 13, and the mirror 14 can be disposed in the movable portion 10b.

In one embodiment, the vanity mirror 10 (and the power storage unit 11 therein) of the present invention does not directly receive power from the vehicle battery or generator that supplies power to the vehicle. In one embodiment, the power storage unit 11 can include batteries, an electrical energy storage unit, or a power supply unit that has both energy storage function and power generation function (such as solar cells). When the power storage unit 11 is any kind of batteries available in the market, a user can conveniently replace the power storage unit 11 to maintain the lighting function of the vanity mirror 10. This invention also can avoid the risk of the accidental long-term power consumption in the prior art to avoid any danger caused thereby.

In one embodiment, the aforementioned front-open state of the vanity mirror 10 is that the movable portion 10b of the vanity mirror 10 is rotated to a state in which the mirror 14 faces the driver. In another embodiment, the mirror 14 can be pulled out from the vanity mirror 10; that is, when the movable portion 10b is pulled out, the mirror 14 faces the driver. The front-open sensing unit 12 can be arranged in correspondence to the way that the movable portion 10b moves to make determination. The front-open sensing unit 12 can include a sensing element that is capable of sensing the angle A or the distance deviation between the movable portion 10 and the mounting portion 10a, such as the Hall sensor in FIG. 1, or in other forms (such as a proximity sensor, or an electrical, optical, or mechanical sensor).

Figure 3:
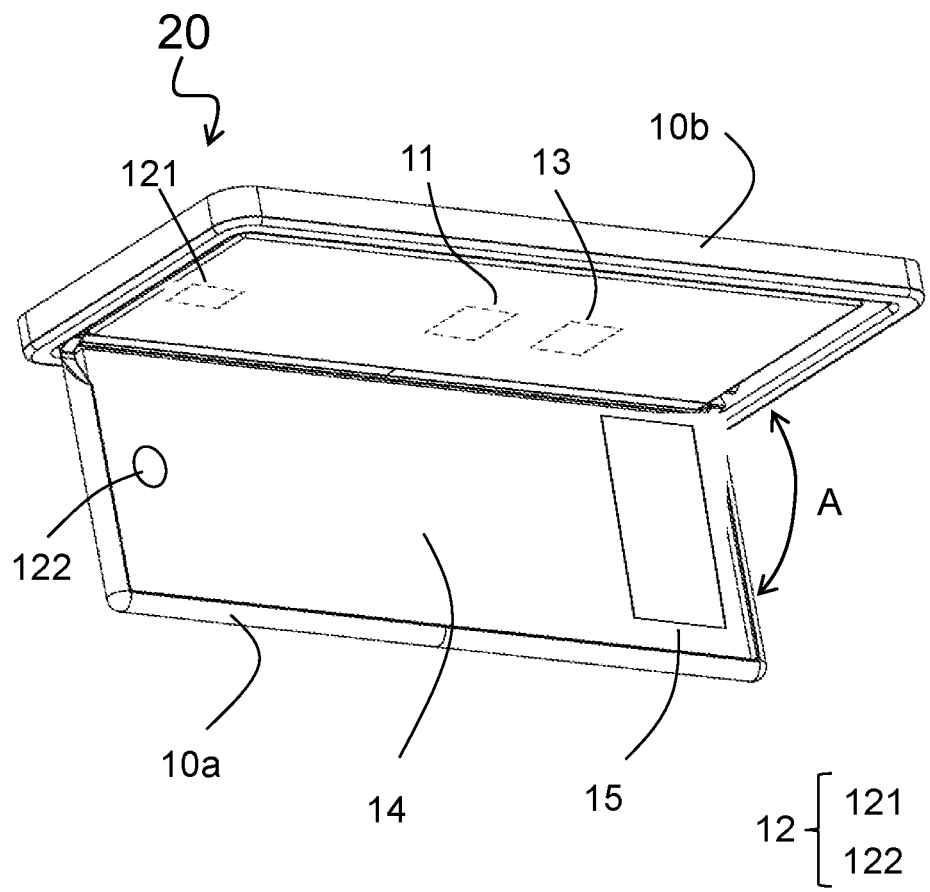
FIG. 3 shows a schematic diagram of a vanity mirror according to one embodiment of the present invention.

Also please note that the layout of the components in the vanity mirror is not limited to that shown in FIG. 1. For example, please refer to FIG. 3, wherein the vanity mirror 20 is arranged such that the mounting portion 10a includes the power storage unit 11, the Hall sensor 121, and the sensing circuit 13; and the movable portion 10b includes the mirror 14, the light source 15, and the magnet 122

In one embodiment, the front-open sensing unit 12 determines whether the position of the movable portion 10b is in the front-open state or the folded state; when the vanity mirror 10 is in the front-open state, the power storage unit 11 conducts electrical power to the light source 15, but when the vanity mirror 10 is in the folded state, the power storage unit 11 does not conduct electrical power to the light source 15, so that the energy consumption of the light source 15 can be saved.

In one embodiment, the sensing circuit 13 includes at least one of an ambient light sensor 131, a proximity sensor 132, and a contact sensor 133. The vanity mirror 10 determines whether to emit light and/or the intensity of the light according whether it is in the front-open state and the sensing result of aforementioned element in the sensing circuit 13. For example, when the ambient light sensor senses that the ambient light is higher than a predetermined light intensity threshold, or when the proximity sensor senses a close object, the light source 15 can be turned off or the light intensity from the light source 15 can be reduced.

In one embodiment, the vanity mirror 10 can employ a combination of an ambient light sensor and a proximity sensor and make determination according to a combination result. For example, the sensed result from the ambient light sensor has a higher priority (or a higher weighting in the combination), or the sensed result from the proximity sensor has a higher priority (or a higher weighting in the combination) proximity sensor, or the sensed result from the ambient light sensor and the sensed result from the ambient light sensor are combined in equal weightings, and the combination result is compared with a threshold to determine whether to emit the light and/or the light intensity from the light source 15, or when one of the sensed result from the ambient light sensor and the sensed result from the proximity sensor reaches an upper or lower threshold, a determination is accordingly made. All these variations fall in the scope of the present invention.

Figure 4:
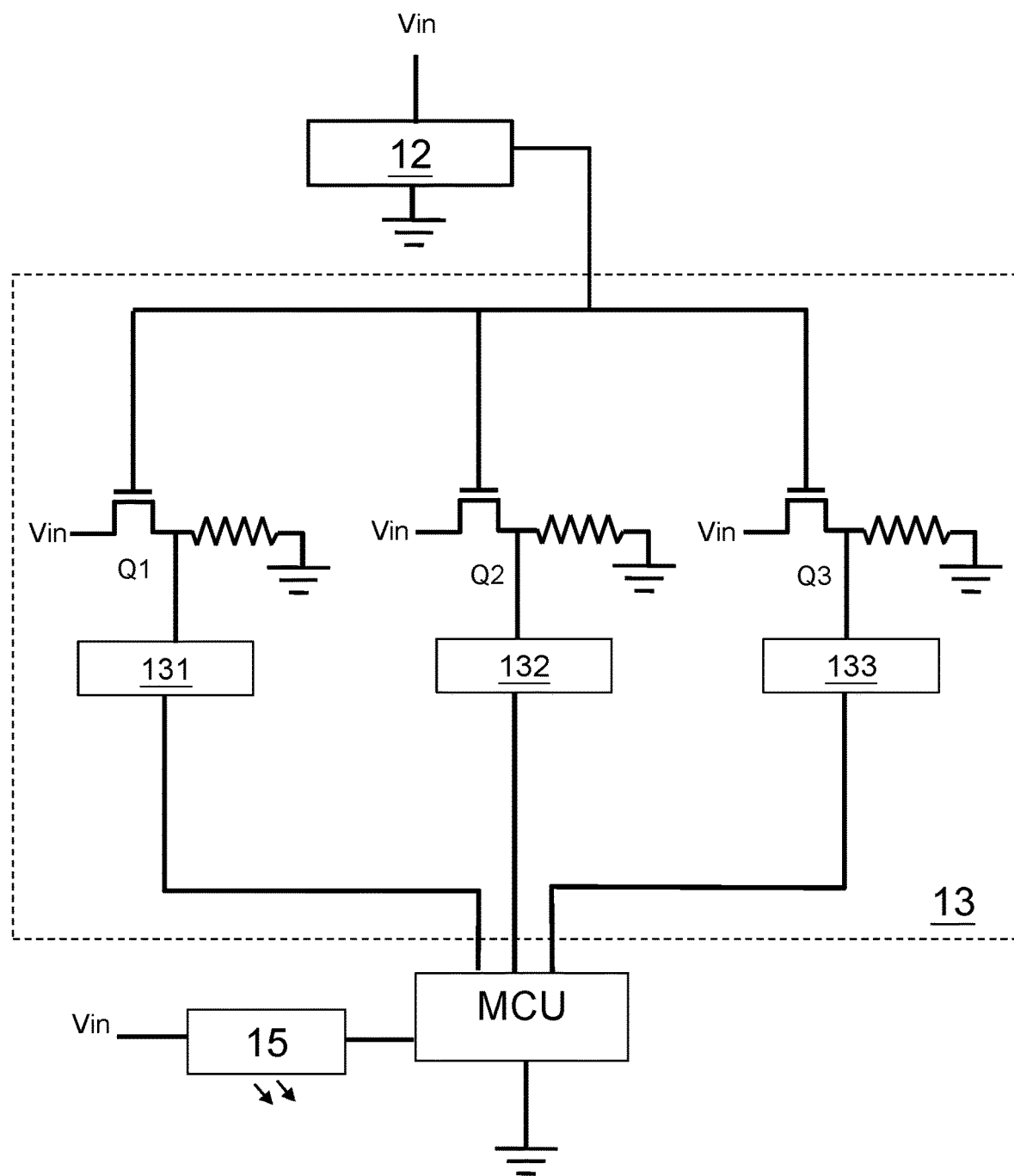
FIG. 4 shows a schematic diagram of a circuit according to one embodiment of the present invention.

The aforementioned various determination combinations can be achieved by software or hardware. For example, FIG. 4 shows a schematic diagram of a circuit including the front-open sensing unit 12, the sensing circuit 13, and the light source 15 according to one embodiment of the present invention. The front-open sensing unit 12 controls whether the voltage Vin from the power storage unit 11 is conducted to the ambient light sensor 131, the proximity sensor 132 and the contact sensor 133 in the sensing circuit 13 through the switches Q1, Q2, and Q3, respectively. The sensing results of the ambient light sensor 131, the proximity sensor 132 and the contact sensor 133 are transmitted to the control unit MCU. The control unit MCU determines whether the light source 15 emits light and/or the intensity of the light according to these sensing results. For example, the higher one of the sensed values from the ambient light sensor 131 and the proximity sensor 132 determines whether the light source 15 emit light and the intensity of light (for example, the outputs of the ambient light sensor 131 and proximity sensor 132 can be converted to the form of voltage signals and coupled to the same node and the voltage at this node is the information transmitted to the control unit MCU).

In the foregoing embodiment, the determination is automatically made based on the sensed values from the ambient light sensor 131 and the proximity sensor 132. However, the present invention also provides the flexibility for a user to manually control. When it is required, the user may adjust the state of the light source 15 by himself/herself. Therefore, in another embodiment, in the front-open state, whether the light source 15 emits light and/or the intensity of the light, or whether to override the light intensity from the light source 15 which for example has been determined automatically according to the sensing values of the ambient light sensor 131 and the proximity sensor 132), for example can be manually controlled according to a number of contacts, a time length of a contact, or a time interval between two contacts sensed by the contact sensor 133, or any combination thereof. For example, in one embodiment, the light intensity is increased as the number of the contacts increases. For another example, when there is a longer time interval between two contacts, the intensity of light emitted by the light source 15 is reduced. For yet another example, the light intensity is determined according to a combination of the number and the time length of specific contacts, and the time interval between two of the specific contacts. For yet another example, according to the number or the time length of the contacts, or the time interval between two of the contacts, the lighting is switched between cold light and warm light, or switched between darker and brighter light. For yet another example, according to the number or the time length of the contacts, or the time interval between two of the contacts, the light-emitting time can be extended or shortened. As such, the present invention can provide great flexibility to the user.

Figure 5A:
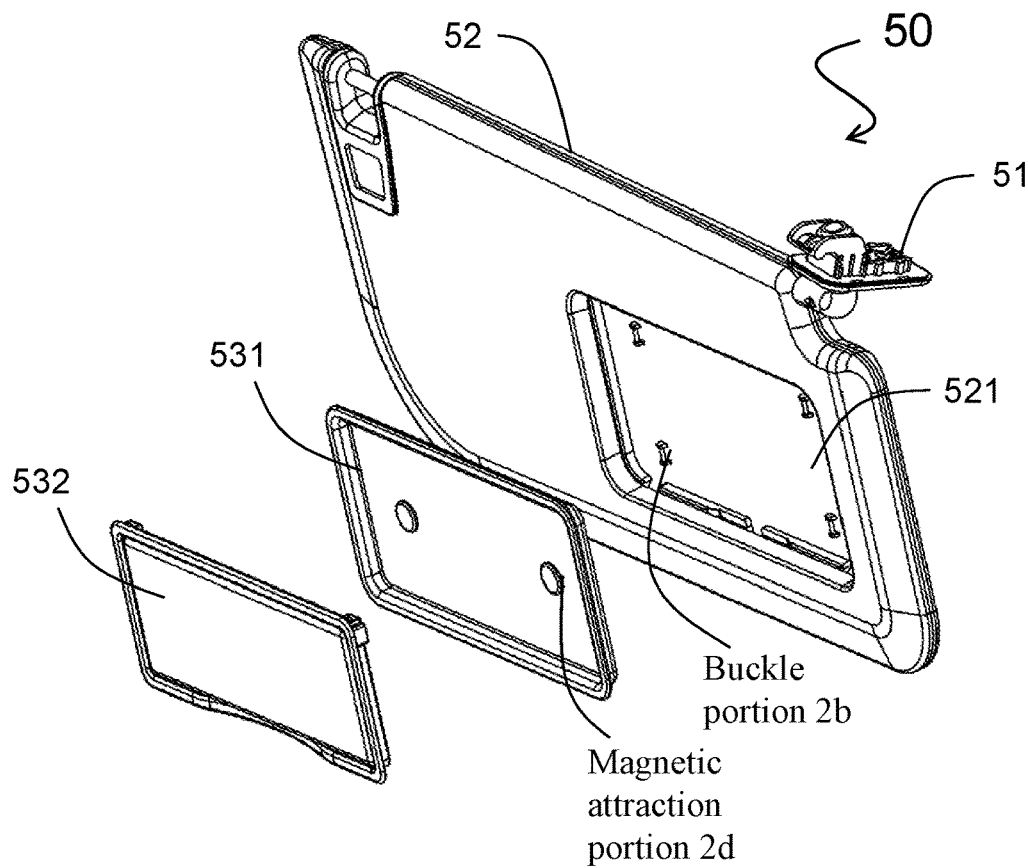
FIGS. 5A and 5B show schematic diagrams of a vehicle sun visor with lighting function according to one embodiment of the present invention.
Figure 5B:
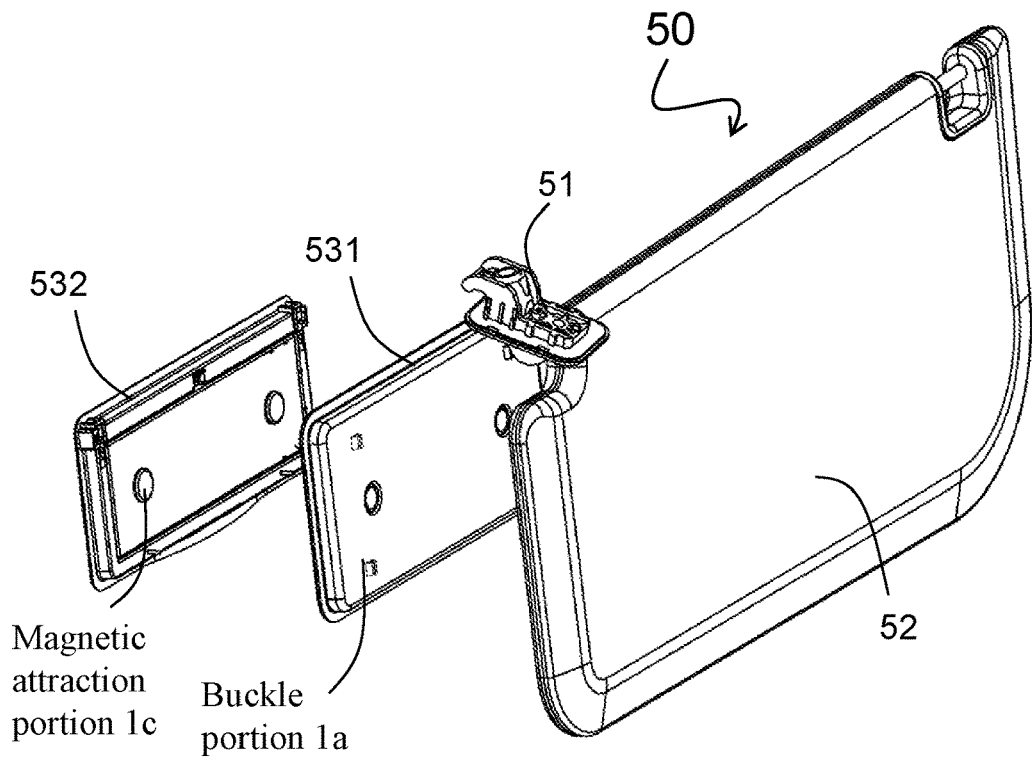

Besides the aforementioned vanity mirror, in another perspective, referring to FIGS. 5A and 5B, the present invention also provides a vehicle sun visor 50 with lighting function, which is fixed to a vehicle body by a ceiling attaching portion 51. The vehicle sun visor 50 includes: a visor body 52, including a receiving portion 521 (in a recess of the visor body 52); and a mirror assembly 53, including a fastening unit 531 and a vanity mirror 532, wherein the fastening unit 531 can be fastened to the receiving portion 521 (connecting each other by fastening the buckle portions 1a and 2b) and magnetically attract the vanity mirror 532 (connecting each other by the magnetic attraction portions 1c and 2d). Please also refer to the components and drawings of the vanity mirror 10 in the foregoing embodiments; the vanity mirror 532 includes: a mounting portion 10a, which is magnetically attracted to the fastening unit 531 (connecting by the magnetic attraction portions 1c and 2d); a mirror 14; a movable portion 10b, configured to afford an angle A or a distance deviation between the mounting portion 10a and the movable portion 10b; a power storage unit 11; a front-open sensing unit 12, configured to sense the angle A or the distance deviation between the mounting portion 10a and the movable portion 10b, to determine whether the vanity mirror 532 is in a front-open state or a folded state according to the sensing result; a sensing circuit 13, wherein when the vanity mirror 532 is in the front-open state, the power storage unit 11 conducts electrical power to the sensing circuit 13; and a light source 15, configured to provide lighting to the mirror 14, wherein in the front-open state, whether to emit light and/or intensity of the light is determined according to the sensing result of the sensing circuit 13. Examples of the front-open state and the folded state of the vanity mirror 532 are shown and described in the foregoing embodiment, so the details thereof are not redundantly repeated here.

The buckle portions 1a and 2b function to fasten the fastening unit 531 to the receiving portion 521, and the fastening unit 531 can be separated from the receiving portion 521 by exerting a pulling force. The magnetic attraction portions 1c and 2d function to connect the fastening unit 531 with the vanity mirror 532 by magnetic attraction force, and the fastening unit 531 can be separated from the vanity mirror 532 by pushing to reduce the attractive force from the magnet. The buckle portions 1a and 2b and the magnetic portions 1c and 2d can be easily detached from one another so that the vanity mirror 532 can be removed for cleaning, battery replacement or other maintenance activities easily, while the fastening unit 531 and the receiving portion 521 are kept in a fastened state in daily normal operation.

Figure 6A:
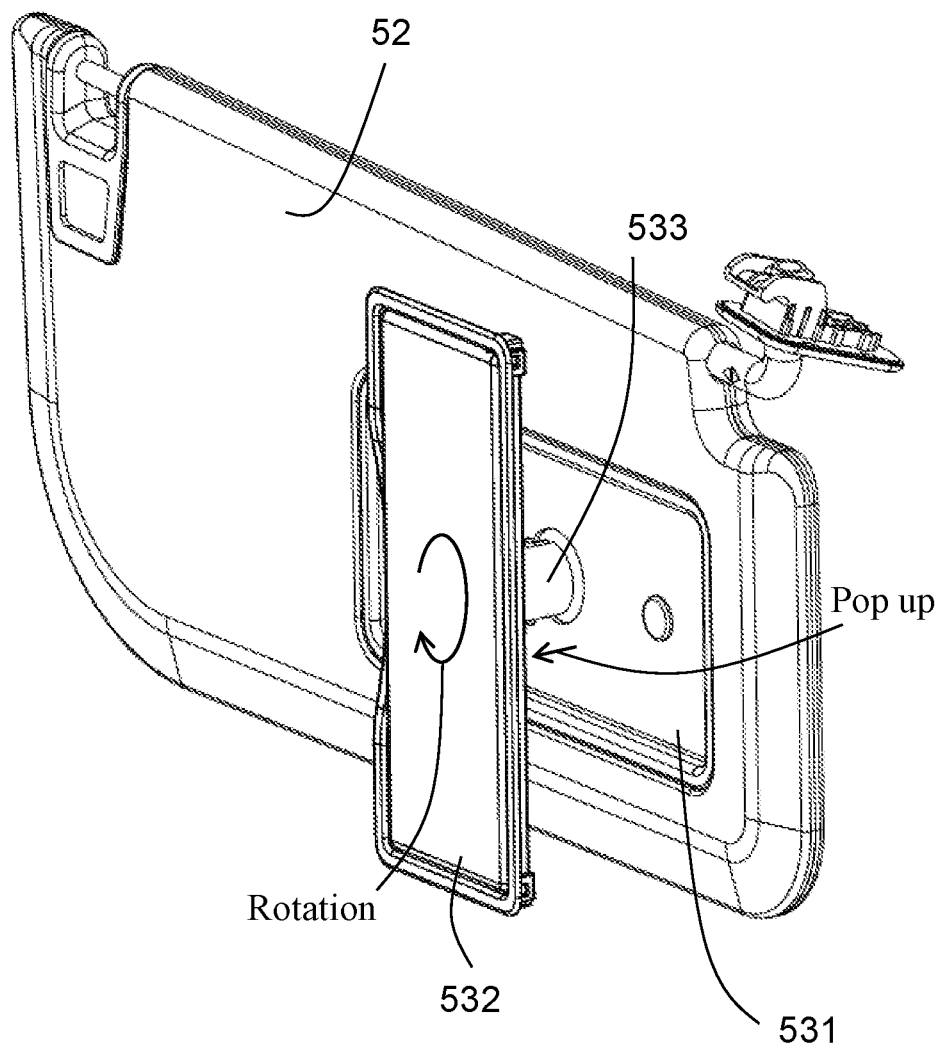
FIGS. 6A, 6B, and 6C show schematic diagrams of operating the pop-up rotating structure between the vanity mirror and the visor body according to one embodiment of the present invention.

In one embodiment as shown in FIG. 6A, a pop-up rotating structure 533 is provided between the vanity mirror 532 and the visor body 52, and the vanity mirror 532 is able to perform pop-up and rotation movements relative to the visor body 52 via the pop-up rotating structure 533. The pop-up and rotation movements can be performed simultaneously or alone, and the rotation angle can be a predetermined angle or adjustable by a user. The predetermined angle is, for example, but not limited to, 90 degrees. In one embodiment, after the pop-up and rotation movements, the vanity mirror 532 for example faces a direction which is perpendicular to a surface of the visor body 52. Thus, the present invention provides multiple options to the user.

Figure 6B:
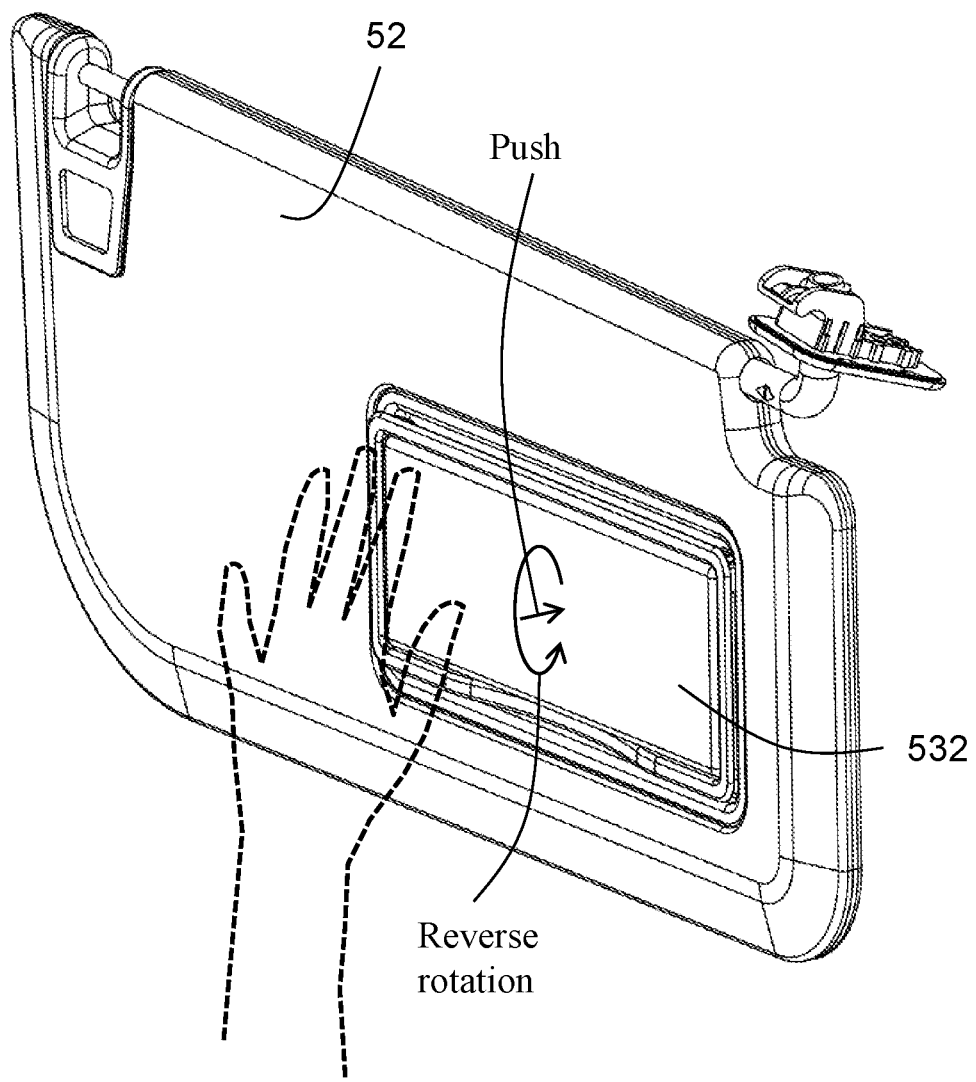

In one embodiment, when closing the vanity mirror 532, the user only needs to push the vanity mirror 532 in the direction toward the visor body 52; that is, pushing the vanity mirror 532 into the fastening unit 531 (FIG. 6B), and the vanity mirror 532 will simultaneously generate a reverse rotation movement so that the vanity mirror 532 can be received into the visor body 52.

Figure 6C:
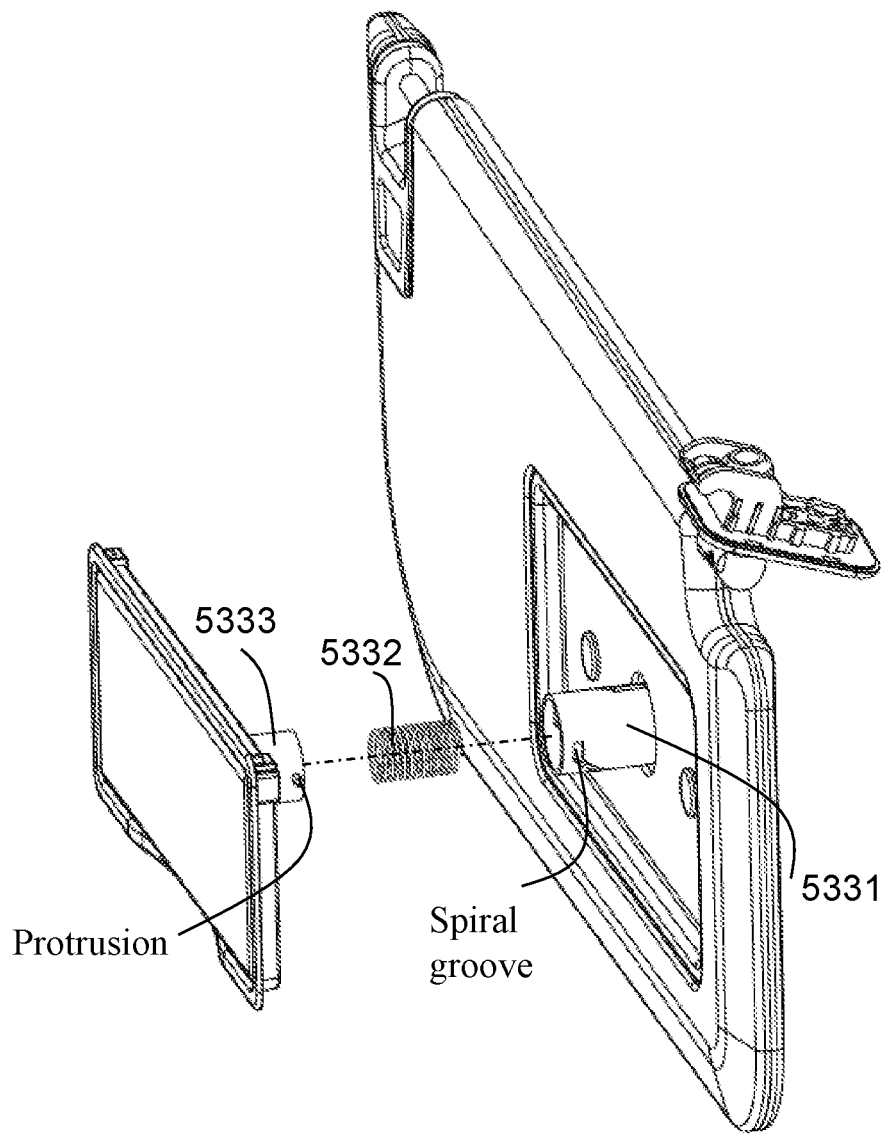

The aforementioned pop-up rotating structure 533 is a movable structure capable of rotation motion and pop-up motion. In one embodiment as shown in FIG. 6C, the pop-up rotating structure 533 includes a first hollow cylinder 5331 with spiral grooves, a spring 5332, and a second hollow cylinder 5333 with protrusions (for fitting into the spiral grooves). The second hollow cylinder 5333 can coaxially insert into the first hollow cylinder 5331, and the spring 5332 can insert inside the first and second hollow cylinders 5331 and 5333. In this approach, when the vanity mirror 532 pops up, or is pressed into the visor body 52, the rotating motion of the vanity mirror 532 shown in FIGS. 6A and 6B can be synchronized with the pop up or press action.

In one embodiment, the pop-up rotating structure 533 between the vanity mirror 532 and the visor body 52 also provides the function to expose the power storage unit 11, for easily replacing the battery therein.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A vanity mirror with lighting function, comprising:
   a mounting portion, connected to a vehicle sun visor;
   a movable portion, configured to afford an angle or a distance deviation between the mounting portion and the movable portion;
   a mirror located in the mounting portion or the movable portion;
   a power storage unit;
   a front-open sensing unit, configured to sense the angle or the distance deviation between the mounting portion and the movable portion, to determine whether the vanity mirror is in a front-open state or a folded state according to the sensing result;
   a sensing circuit, wherein when the vanity mirror is in the front-open state, the power storage unit conducts electrical power to the sensing circuit; and
   a light source, configured to provide lighting function, wherein in the front-open state, whether to emit light and/or intensity of the light is determined according to the sensing result of the sensing circuit;
   wherein the vanity mirror does not directly receive power from a vehicle battery or generator supplying electrical power to the vehicle;
   wherein the sensing circuit includes at least one of an ambient light sensor, a proximity sensor, and a contact sensor;
   wherein in the front-open state, whether to emit light and the intensity of the light, or whether to override previously determined intensity of the light, is determined according to a number of contacts, a time length of a contact, a time interval between two contacts, or any combination thereof, which is/are detected by the contact sensor.

2. The vanity mirror with lighting function according to claim 1, wherein whether to emit light and the intensity of the light is determined according to a combination of the sensing results of more than one of the ambient light sensor, the proximity sensor, and the contact sensor.

3. The vanity mirror with lighting function according to claim 1, wherein in the front-open state, when the ambient light sensor senses that the ambient light is higher than a predetermined light intensity or the proximity sensor senses a nearby object, the light source is turned off or the intensity of the light is reduced.

4. The vanity mirror with lighting function according to claim 1, wherein the front-open sensing unit includes a Hall sensor or a proximity sensor.

5. The vanity mirror with lighting function according to claim 1, wherein when the vanity mirror is in the folded state, the power storage unit turns off the electrical power to the light source.

6. The vanity mirror with lighting function according to claim 1, wherein the mounting portion is disposed in the vehicle sun visor by fastening a fastening unit to a visor body, and the vehicle sun visor is fixed to a vehicle body by a ceiling attaching portion, wherein the vehicle sun visor is for shielding the ambient light passing through the window glass.

7. A vehicle sun visor with lighting function, fixed to a vehicle body by a ceiling mounting portion, to shield ambient light passing through a window glass, wherein the vehicle sun visor comprises:
   a visor body, including a receiving portion; and
   a mirror assembly, including a fastening unit and a vanity mirror, wherein the fastening unit is configured to be fastened to the receiving portion and magnetically attract the vanity mirror, and wherein the vanity mirror includes:
      a mounting portion, magnetically attracted to the fastening unit;
      a movable portion, configured to afford an angle or a distance deviation between the mounting portion and the mirror;
      a mirror located in the mounting portion or the movable portion;
      a power storage unit;
      a front-open sensing unit, configured to sense the angle or the distance deviation between the mounting portion and the movable portion, to determine whether the vanity mirror is in a front-open state or a folded state according to the sensing result;
      a sensing circuit, wherein when the vanity mirror is in the front-open state, the power storage unit conducts electrical power to the sensing circuit; and
      a light source, configured to provide lighting function, wherein in the front-open state, whether to emit light and/or intensity of the light is determined according to the sensing result of the sensing circuit.

8. The vehicle sun visor with lighting function according to claim 7, further including a pop-up rotating structure between the vanity mirror and the visor body, whereby the vanity mirror performs a pop-up movement and a rotation movement relative to the visor body.

* * * * *